June 3, 1969     JAMES E. WEBB     3,448,273
ADMINISTRATOR OF THE NATIONAL AERONAUTICS
AND SPACE ADMINISTRATION
PLURALITY OF PHOTOSENSITIVE CELLS ON A PYRAMIDICAL BASE
FOR PLANETARY TRACKERS
Filed April 20, 1966

TO A
SERVO
SYSTEM

*INVENTOR.*
ROBERT Y. WONG
BY
ATTORNEYS 3,448,273
PLURALITY OF PHOTOSENSITIVE CELLS ON
A PYRAMIDICAL BASE FOR PLANETARY
TRACKERS
James E. Webb, Administrator of the National Aeronautics and Space Administration, with respect to an invention of Robert Y. Wong, Glendale, Calif.
Filed Apr. 20, 1966, Ser. No. 545,228
Int. Cl. G01j 1/20
U.S. Cl. 250—203   3 Claims

ABSTRACT OF THE DISCLOSURE

A planetary tracker defining a foresighted pyramid structure having four triangular sides which support light sensitive photocells. The cell on each pair of opposite sides are connected to a separate comparator, with the outputs of the two comparators used to provide signals indicative of the relative orientation of the vertex of the structure with respect to the direction or orientation of a planet which radiates light received by the photocells.

Origin of invention

The invention described herein was made in the performance of work under a NASA contract and is subject to the provisions of Section 305 of the National Aeronautics and Space Act of 1958, Public Law 85-568 (72 Stat. 435; 42 USC 2457).

This invention relates to an energy sensing apparatus and, more particularly, to an apparatus for tracking an energy source by sensing the energy radiating therefrom.

Various devices have been developed to track a particular object and to orient instruments with respect thereto. For example, for space exploration, planetary tracking devices or trackers have been developed to track a particular planet, in order to optimally orient various experimental instruments with respect thereto. Generally, these trackers sense energy radiating from such a planet to develop control signals, used to orient the device with respect to the planet.

In presently known trackers, most of which sense light radiating from the planet, optical systems are employed incorporating compound lenses and mirror arrangements. Such arrangements, in addition to their optical complexity, are subject in space to the outgassing of the cement, used in assembling the lens and the mirrors. Also, in order to gather sufficient energy to produce satisfactory orientation-controlling signals, various prior art trackers use parabolic mirrors and lenses which are quite large, thereby increasing the overall size and weight of the tracker, which is generally undesirable.

It is therefore an object of the present invention to provide a new energy sensing device.

Another object of the invention is to provide an energy sensing device which does not require complex mirror and lens assemblies typical of prior art trackers.

A further object of the present invention is the provision of a new relatively simple tracking device which provides orientation controlling signals as a function of its orientation with respect to a source of energy.

A further object is to provide a new structure for a planetary tracker in which signals are developed to maintain the tracker in a particular orientation with respect to an energy radiating planet.

Still a further object is to provide a new planetary tracker sensing light radiating from a planet for developing orientation controlling signals to maintain the tracker in a selected orientation with respect to the planet.

These and other objects of the invention are achieved by providing a tracker comprising a four-sided pyramid structure which has a square base and four triangular sides or surfaces, meeting at a vertex. On the surfaces, which are substantially equal in area, are mounted energy-sensitive elements, such as solar cells. The cells on each surface are arranged in a matrix to define an energy sensitive area, with the matrix providing an output signal as a function of the energy received by the cells thereof. The energy-sensitive areas on the four sides are equal to one another, so that as long as the vertex of the tracker points to the center of a light source, such as a planet, an equal amount of light is received by each of the cell matrices, and therefore the output signals therefrom such as voltages developed therein, are equal to one another. Consequently, if the signals or voltages from matrices on opposite sides of the pyramid are compared, the signal difference therebetween is substantially zero.

On the other hand, if the vertex does not point to the center of the light source, more light is received by the cells on one side of the pyramid than by the cells on the opposite side thereof. As a result, a signal difference may be developed by comparing the signals from matrices on opposite sides of the pyramids. The two differential signals produced by comparing the signals from the two pairs of opposite sides of the pyramids may be used to control the orientation of the tracker by adjusting its position in order to null or zero the two differential signals and thereby maintain the vertex thereof in a position pointing towards the center of the light source.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
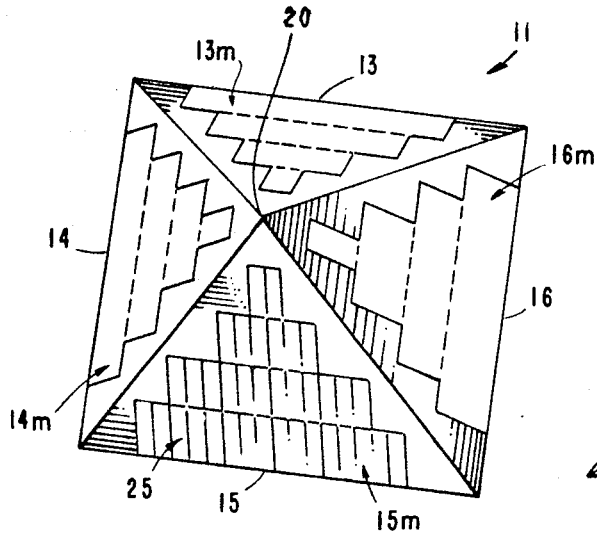
FIGURE 1 is a top perspective view of the novel tracker of the present invention.
Figure 2:
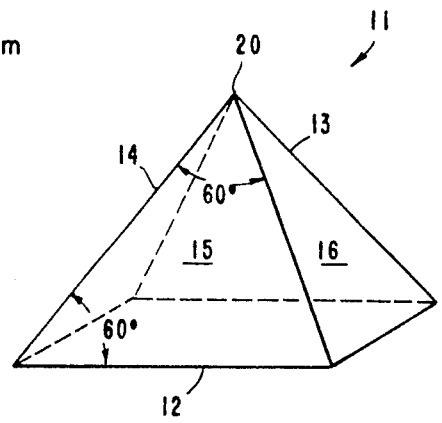
FIGURE 2 is an isometric view of the pyramid structure of the present invention.

Reference is now made to FIGURES 1 and 2 which are a top perspective view of the tracker of the present invention and an isometric view of the pyramid structure thereof without the energy-sensitive cell respectively. As seen from the figures, the tracker comprises of a four-sided pyramid structure 11 having a square base 12 and four triangularly shaped sides or surfaces designated by reference numerals 13 through 16 respectively. The triangular sides or surfaces all meet at a vertex 20. On each of the four sides, are mounted energy-sensitive elements, shown in FIGURE 1 as comprising photoelectric, also known as solar, cells 25. The cells on each side are interconnected to form a cell matrix or module, thereby forming an energy-sensitive area on the side. The cell matrices on sides 13 through 16 are designated in FIGURE 1 by reference numerals 13m through 16m respectively.

Figure 3:
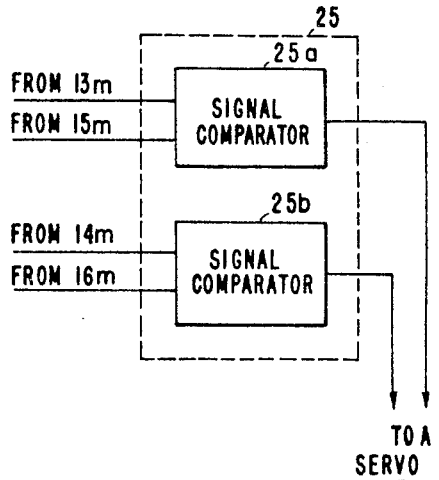
FIGURE 3 is a block diagram useful in explaining the operation of the tracker.

Each of the matrices is electrically insulated from the others, so that each may provide an independent output signal such as a voltage produced as a function of the light radiating thereon. The output signals of the four matrices are supplied to a signal comparing circuit 25 shown in block diagram in FIGURE 3 to which reference is made herein, the outputs of matrices 13m and 15m on opposite sides 13 and 15 respectively being supplied to a first signal comparator 25a, while the outputs of matrices 14m and 16m from opposite sides 14 and 16 respectively are supplied to a second signal comparator 25b. The function of each of comparators 25a and 25b is to provide an output signal, the amplifier and polarity of which is a function of the difference between the two input signals supplied thereto from two of the matrices. It should be appreciated that, as long as the vertex 20 of structure 11 is pointing directly at the center of a source of light energy, such as a planet, equal amount of light is radiated onto each one of the matrices, so that the output signals therefrom are equal and therefore the output of each of comparators 25a and 25b is zero.

On the other hand, when structure 11 is tilted from the position in which its vertex is directly pointing at the center of the light source, the effective energy receiving areas of matrices on opposite sides of structure 11 differ from one another and therefore their output signals will be different. Consequently, the two signals supplied to one of the comparators is different, resulting in an output signal therefrom, having an amplitude and polarity which is a function of the amplitudes of the two input signals thereto. Thus the output of the comparator may be thought of as a signal representing the difference in energy received by the matrices related thereto.

Figure 4:
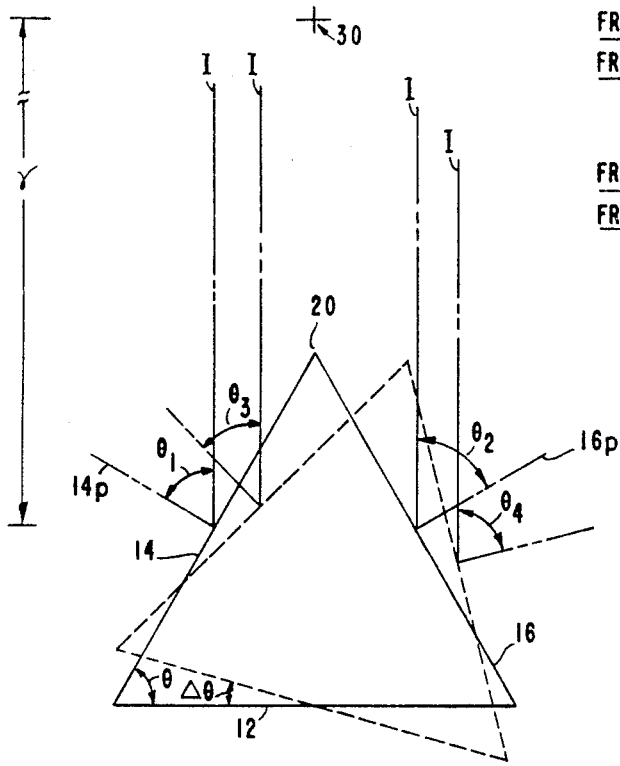
FIGURE 4 is a side cross-sectional view of the tracker useful in explaining the orientational relationship thereof with respect to an energy source and the signals produced therein.

The principle of operation of the tracker of the present invention may better be explained in conjunction with FIGURE 4 which is a cross-sectional view of structure 11.

Let us assume that light rays are directed onto structure 11 from a source, the center of which is located at 30. Let it be further assumed that the light intensity is designatable by I and that the location of the source at 30 is at large enough a distance $\gamma$ from structure 11 so that rays may be shown as parallel. The total energy or flux radiating unto the cell matrices 14m and 16m on sides 14 and 16 may be expressed as $$E_{14} = \frac{I \cos \theta_1 A_{14}}{\gamma^2} \text{ and } E_{16} = \frac{I \cos \theta_2 A_{16}}{\gamma^2}$$

where $A_{14}$ and $A_{16}$ are the areas of matrices 14m and 16m respectively and $\theta_1$ and $\theta_2$ define the angles between the rays and lines 14p and 16p perpendicular to surfaces 14 and 16 respectively.

Since it is assumed that the areas of the matrices are the same $A_{14} = A_{16}$. Also when the vertex 20 points to the center of source at 30 $\theta_1 = \theta_2$ and therefore $E_{14} = E_{16}$. However if the structure 11 is tilted by an angle $\Delta\theta$ as indicated in FIGURE 4 by the dashes structure angles $\theta_1$ and $\theta_2$ are no longer equal. The total flux received by matrices 14m and 16m in the tilted position may be defined as $$E_{14}' = \frac{I \cos \theta_3 A_{14}}{\gamma^2} \text{ and } E_{16}' = \frac{I \cos \theta_4 A_{16}}{\gamma^2}$$

and the voltage output therefrom being defined as $$V_{14}' = \frac{KIA_{14}}{\gamma^2} \cos \theta_3 \text{ and } V_{16}' = \frac{KIA_{16}}{\gamma^2} \cos \theta_4$$

where K is a conversion factor expressed in volts per flux unit.

Since by geometry it is seen that $\theta_3 = \theta_1 - \Delta\theta$ and $\theta_4 = \theta_1 + \Delta\theta$, the voltage difference $\Delta V$ between the voltages produced by the two matrices may be expressed as $$\Delta V = V_{14}' - V_{16}' = \frac{KIA_{14}}{\gamma^2} [\cos (\theta_1 - \Delta\theta) - \cos (\theta_1 + \Delta\theta)]$$

Thus the voltage difference is a function of the variable $\Delta\theta$. Since the maximum incremental changes of the cosine of an angle occurs near the value of 90°, it is generally desirable to make the angle $\theta_1$ as close to 90° as possible. However since a 90° incident angle is not possible for pyramid configuration, the angle of incident $\theta_1$ is made as large as possible consistent with the amount of cell area needed to produce a satisfactory output.

From the foregoing, it should thus be appreciated that when the structure 11 is not oriented with respect to the center of source at 30, one or both of comparators 25a and 25b (FIGURE 3) will provide output signals related to the misorientation. These signals may be used in a servo system (not shown) to maintain the structure to properly track the source located at 30 by being properly oriented with respect thereto and thereby reduce the outputs of the comparators 25a and 25b to zero. In addition with orienting the tracker, any experimental instruments mounted in a fixed relationship with respect thereto are simultaneously oriented in their desired relationship with respect to the source located at 30.

From the foregoing, it is seen that the tracker herein disclosed does not employ lenses or other optical assemblies which are conventionally employed producing related technical problems hereinbefore described. The tracker of the present invention employs in the embodiment described, commercially available solar cells which have been extensively used in space exploration with a high degree of reliability.

There has accordingly been shown and described herein a novel energy source tracker which utilizes its four sides on a pyramid structure to mount energy-sensitive elements thereon. By comparing the signals from elements on opposite pairs of sides, orientation control signals are produced to properly control the position of the tracker with respect to the energy source. It should be appreciated that those familiar with the art may make modifications in the specific arrangements heretofore described without departing from the true spirit of the invention. Therefore, all such modifications and/or equivalents are deemed to fall within the scope of the invention as claimed in the appended claims.

What is claimed is:

1. A tracker for tracking an energy-radiating planet comprising:
   a four-sided pyramid structure defining a square base and four triangular surfaces meeting at a common vertex;
   energy sensitive means mounted on said four surfaces and defining energy receiving areas thereon, to receive equal quantities of energy from said planet on areas on opposite sides when the vertex of said structure substantially points to the center of said planet; and
   means for comparing the energy received by the energy sensitive means on each pair of opposite surfaces for providing two energy difference signals indicative of the orientations of said vertex with respect to said planet, said energy sensitive means comprising photosensitive cells arranged in a substantially identical matrix on each of said surfaces to provide a voltage signal as a function of light received thereby from said planet, each matrix including a plurality of photocells arranged in several rows from the base of each surface to the vertex thereof, with the number of cells in each row decreasing toward said vertex.

2. The tracker defined in claim 1 wherein total light energy E received by the cells on each surface defined as E equals $I \cos \theta A/\gamma^2$ where I is the light intensity of said source, A represents the light sensitive area of said cells, $\gamma$ is the distance from said structure to said source and $\theta$ is an angle defined by the direction of the light from said source and a line perpendicular to said surface, the difference in the total light energy received by cells on opposite sides being substantially zero when the angles between the direction of light from said source and lines perpendicular to said surfaces are substantially equal.

3. The tracker defined in claim 2 wherein the angle between said base and each of said triangular surfaces is at least 60 degrees.

References Cited

UNITED STATES PATENTS

| | | | |
|---|---|---|---|
| 3,112,399 | 11/1963 | Chew | 250—203 X |
| 3,343,445 | 9/1967 | Norman | 250—203 X |

JAMES W. LAWRENCE, *Primary Examiner.*

C. R. CAMPBELL, *Assistant Examiner.*

U.S. Cl. X.R.

250—83.3, 208, 210, 212, 220; 313—94